US009432874B2

(12) United States Patent
Rácz et al.

(10) Patent No.: US 9,432,874 B2
(45) Date of Patent: *Aug. 30, 2016

(54) SERVICE-AWARE PROFILING FOR TRANSPORT NETWORKS

(75) Inventors: Sándor Rácz, Cegléd (HU); Balázs Gerö, Budapest (HU); János Harmatos, Budapest (HU); Szilveszter Nádas, Budapest (HU)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 118 days.

This patent is subject to a terminal disclaimer.

(21) Appl. No.: 14/350,215

(22) PCT Filed: Oct. 14, 2011

(86) PCT No.: PCT/EP2011/068023
§ 371 (c)(1),
(2), (4) Date: Jun. 19, 2014

(87) PCT Pub. No.: WO2013/053404
PCT Pub. Date: Apr. 18, 2013

(65) Prior Publication Data
US 2014/0293793 A1 Oct. 2, 2014

(51) Int. Cl.
*H04W 28/02* (2009.01)
*H04L 12/813* (2013.01)
(Continued)

(52) U.S. Cl.
CPC .......... *H04W 28/0268* (2013.01); *H04L 47/20* (2013.01); *H04L 47/31* (2013.01); *H04L 47/215* (2013.01)

(58) Field of Classification Search
None
See application file for complete search history.

(56) References Cited

U.S. PATENT DOCUMENTS 6,970,426 B1 11/2005 Haddock et al.
9,065,779 B2 * 6/2015 Stanwood ............. H04L 47/623
(Continued)

FOREIGN PATENT DOCUMENTS

EP 1220493 A1 7/2002
EP 2317701 A1 5/2010
(Continued)

OTHER PUBLICATIONS

Heinanen et al. "A Two Rate Three Color Marker." The Internet Society. Network Working Group. Request for Comments 2698. University of Pennsylvania. Sep. 1999. 1-6.
(Continued)

*Primary Examiner* — Candal Elpenord
(74) *Attorney, Agent, or Firm* — Patents on Demand P.A.; Brian K. Buchheit; Scott M. Garrett

(57) ABSTRACT

A method is provided of transporting data packets over a telecommunications transport network. The data packets are carried by a plurality of bearers, each carrying data packets that relate to different ones of a plurality of services. In the method bandwidth profiling is applied to the data packets of each bearer, independently of the other bearers, to identify and mark the data packets of each of the bearers that are conformant with a predetermined maximum information rate for the bearer. The data packets are forwarded for transport through the transport network, wherein, if there is insufficient bandwidth available in the transport network to transport all data packets, data packets not identified by the profiling as being conformant are discarded, so as not to be transported through the transport network.

18 Claims, 5 Drawing Sheets

(51) Int. Cl.
*H04L 12/833* (2013.01)
*H04L 12/819* (2013.01)

(56) References Cited

U.S. PATENT DOCUMENTS

| | | | |
|---|---|---|---|
| 2002/0036983 A1* | 3/2002 | Widegren | H04L 12/14 370/230.1 |
| 2002/0107908 A1 | 8/2002 | Dharanikota et al. | |
| 2004/0052212 A1 | 3/2004 | Baillargeon | |
| 2004/0213210 A1* | 10/2004 | Dube | H04L 12/5695 370/352 |
| 2005/0135378 A1 | 6/2005 | Rabie | |
| 2005/0232150 A1 | 10/2005 | Nishimura et al. | |
| 2006/0176818 A1 | 8/2006 | Olsen et al. | |
| 2006/0187827 A1 | 8/2006 | Smith et al. | |
| 2006/0187839 A1 | 8/2006 | Smith et al. | |
| 2006/0215558 A1* | 9/2006 | Chow | H04L 47/10 370/232 |
| 2008/0095049 A1 | 4/2008 | Bugenhagen et al. | |
| 2008/0155087 A1 | 6/2008 | Blouin et al. | |
| 2009/0245104 A1 | 10/2009 | Nishimura et al. | |
| 2010/0061260 A1 | 3/2010 | Bugenhagen et al. | |
| 2010/0135229 A1* | 6/2010 | Lohr | H04W 72/1284 370/329 |
| 2010/0322072 A1 | 12/2010 | Fujihira et al. | |
| 2011/0158101 A1 | 6/2011 | Figueira | |
| 2012/0195326 A1 | 8/2012 | Krzanowski et al. | |
| 2014/0286169 A1 | 9/2014 | Gunduzhan et al. | |
| 2014/0293793 A1 | 10/2014 | Rácz et al. | |
| 2014/0301195 A1 | 10/2014 | Briscoe et al. | |

FOREIGN PATENT DOCUMENTS

| | | |
|---|---|---|
| WO | 2007078404 A1 | 7/2007 |
| WO | 2008049425 A1 | 5/2008 |
| WO | 2008055936 A1 | 5/2008 |
| WO | 2013053403 A9 | 4/2013 |
| WO | 2013053405 A1 | 4/2013 |

OTHER PUBLICATIONS

Unknown, Author. "Ethernet Service Characteristics." G.8011 Version 3 Draft. Telecommunication Standardization Sector of ITU. Chengdu. Sep. 2011. 1-40.

Santitoro, R., "Bandwidth Profiles for Ethernet Services," Annual Review of Communications. National Engineering Consortium; XP-001520497; Jan. 1, 2005. pp. 349-355. vol. 58. Chicago, Illinois, US.

3GPP. "3rd Generation Partnership Project; Technical Specification Group Services and System Aspects; General Packet Radio Service (GPRS) enhancements for Evolved Universal Terrestrial Radio Access Network (E-UTRAN) access (Release 10)." 3GPP TS 23.401 V10.5.0. Sep. 2011. 1-282.

3GPP, "3rd Generation Partnership Project; Technical Specification Group Core Network and Terminals; Domain Name System Procedures; Stage 3 (Release 9)", 3GPP TS 29.303 V9.2.0, Sep. 2010, 1-51.

3GPP, "3rd Generation Partnership Project; Technical Specification Group Core Network and Terminals; Numbering, addressing and identification (Release 9)", 3GPP TS 23.003 V9.4.0, Sep. 2010, 1-76.

IEEE, "Virtual Bridged Local Area Networks—Amendment 4: Provider Bridges", IEEE P802.1ad/D2.4, Draft Standard for Local and Metropolitan Area Networks, Sep. 27, 2004, 1-129.

Unknown, Author, "Carrier Ethernet Class of Service—Phase 1", The Metro Ethernet Forum, MEF 23, Implementation Agreement, 2009, 1-41.

Sanitoro, Ralph, "Metro Ethernet Services—A Technical Overview", Metro Ethernet Forum, 2003, http://www.mef.net/Assets/White_Papers/Metro-Ethernet-Services.pdf, 2003, 1-12.

Santitoro, Ralph, "Bandwith Profiles for Ethernet Services", Metro Ethernet Forum, 2004-2009, https://www.mef.net/Assets/White_Papers/Bandwith-Profiles-for-Ethernet-Services.pdf, 2004, 1-8.

* cited by examiner

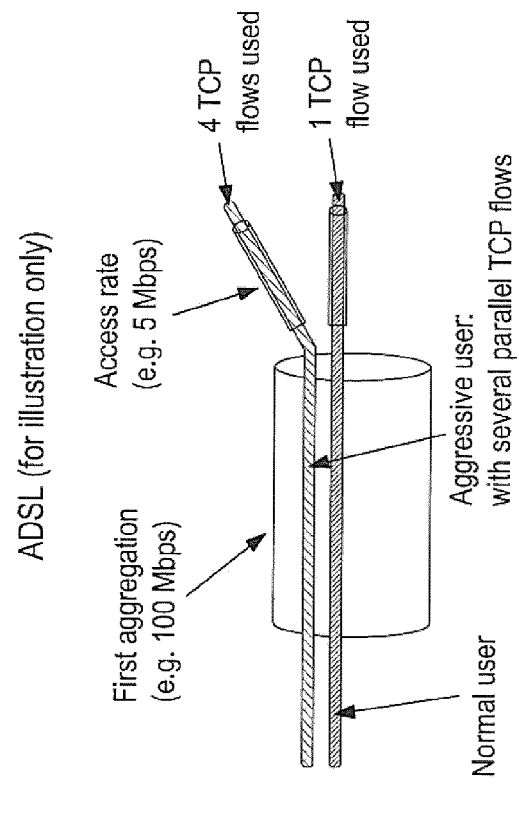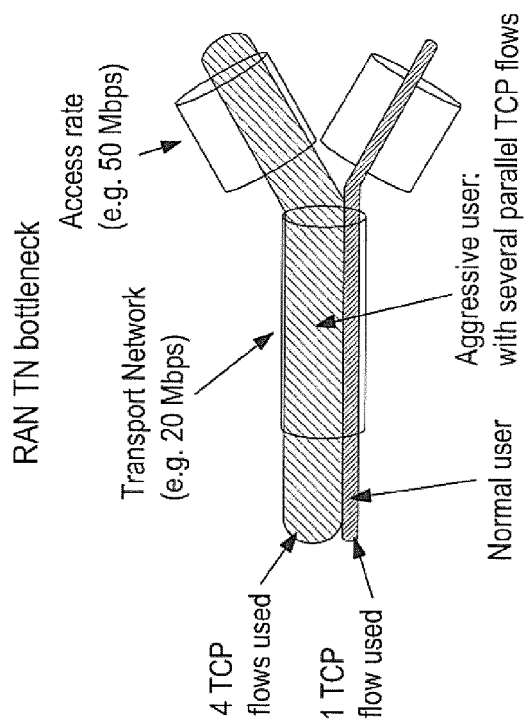
Fig 3

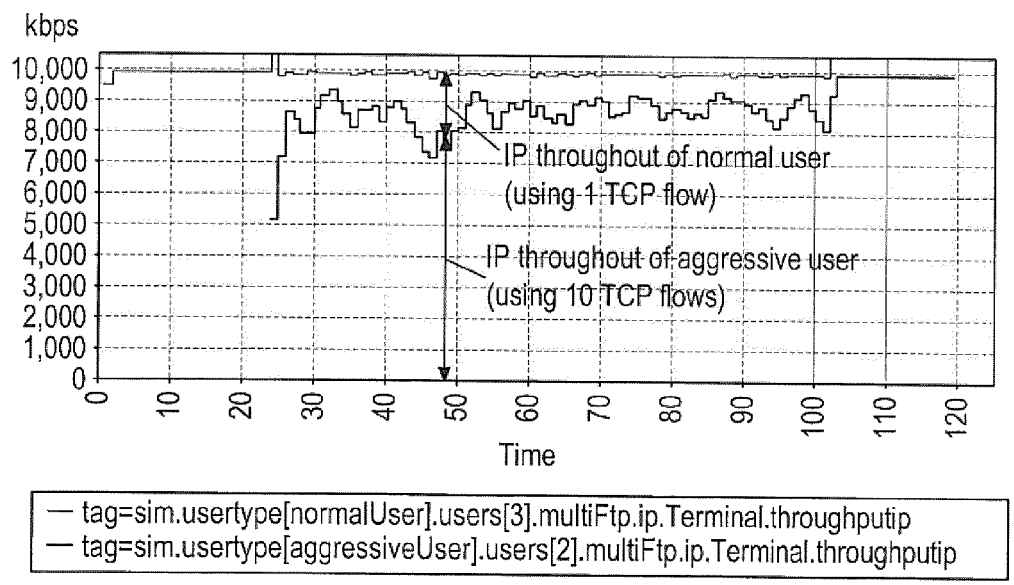
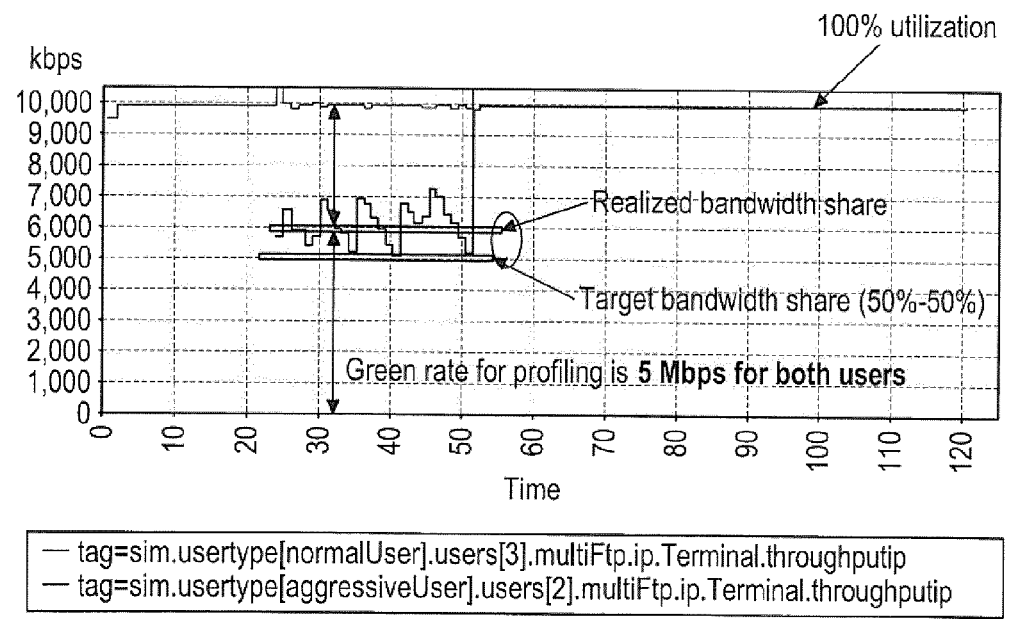
Fig 5

SERVICE-AWARE PROFILING FOR TRANSPORT NETWORKS

TECHNICAL FIELD

The present invention relates to improvements in the handling of data communications transmitted across a transport network.

BACKGROUND

A transport network (TN) is used to carry data signals between a Radio Base Station (RBS), such as a NodeB or an eNodeB in 3G Long-Term Evolution (LTE) networks, and a Serving gateway (S-GVV) or Packet Data Network gateway (PDN-GW). A TN may be operated by a mobile network operator or by a third party transport provider. In the latter case there would be a Service Level Agreement, SLA, between the mobile and transport operators. With the rapid growth of digital data telecommunications following the introduction of 3G and 4G technology, TNs may frequently act as bottlenecks in the overall data transport process. Thus, various systems and methods have been proposed for improving or prioritising the way that data packets are transported by the bearers.

Service differentiation in the Radio Access Network (RAN) is one supplementary means for more efficiently handling high volumes of traffic. As a simple example, using service differentiation a higher bandwidth share can be provided for a premium service, and in this way the overall system performance can be improved. As another example, a heavy service such as p2p traffic, can be down-prioritized. Implementing such service differentiation methods requires integration into the Quality of Service (QoS) concept of LTE and Universal Mobile Telecommunications System (UMTS) technology. Details of the QoS concept for LTE can be found in the $3^{rd}$ Generation Project Partnership (3GPP) Technical Specification TS 23.410. The main idea of this concept is that services with different requirements use different bearers. When a User Equipment (UE) attaches to the network a default-bearer is established (typically a best-effort service). However, if the UE invokes services having different QoS parameters then a dedicated bearer is established for each service. This is shown schematically in FIG. 1 for an LTE network architecture and traffic flows to/from the Application/Service layer 100 of a network—for example an IP Multimedia Subsystem (IMS) network. In FIG. 1, there are two Unicast Evolved Packet System (EPS) bearers each carrying traffic (i.e. data packets) in both directions: up-loaded traffic sent from a User Entity (UE) 102 with a Radio Bearer to an eNodeB 104, then with a S1 Bearer over a TN to a Serving Gateway (SGVV) 106, and then with a S5/S8 Bearer to a PDN-GW 108; and downloaded traffic in the reverse direction. A similar concept would apply with UMTS network architecture, details of which can be found in "3G Evolution, HSPA and LTE for Mobile Broadband" by Erik Dahlman, Sefan Parkvall, Johan Skold and Per Beming, Academic Press, Elseveir, ISBN 9780123745385. Service differentiation can be applied for both guaranteed bit-rate (GBR) and non-GBR traffic. The present disclosure is concerned only with non-GBR traffic.

FIG. 2 illustrates schematically in more detail the TN between the eNodeB 104 and the SGW 106 for the LTE example. This shows non-GBR data packets 120, that include packets 120a of a first bearer that relate to a first service provided by a first server 110, and packets 120b of a second bearer that relate to a second service provided by a second server 112. These data packets 120 are destined for user equipment such as UE 102 at the other side of the TN, where the arriving data packets are handled by a scheduler 114 and eNodeB 104. In addition to the non-GBR data packets, the TN also handles synchronization data and voice or other GBR traffic, as shown, and which has a strict priority above non-GBR traffic but which is not a concern of the present disclosure. The bandwidth available for sending the non-GBR traffic is shared between the bearers, but when there is congestion so that there is insufficient bandwidth for the TN to handle all the non-GBR traffic, then some data packets have to be dropped (shown as RED dropped packets in the Figure). The problem that arises is how to decide which non-GBR data packets should be dropped.

The bandwidth share of a Bearer cannot be controlled by the RAN, and so instead the sharing of bandwidth between the Bearers is currently mainly determined by the application level protocols, the service used and the user behaviour. In the current LTE solution for non-GBR traffic, as shown in FIG. 2, the traffic flow through the TN bottleneck is handled by the application level Transmission Control Protocol (TCP), which deals with congestion by setting the packet throughput according to the available bandwidth. If packet losses start to occur, then the TCP reduces the speed at which packets are delivered to the TN, while after successful packet forwarding the speed is increased gradually. However some greater level of control can be achieved using a sophisticated QoS solution in the TN where different types of non-GBR traffic are put into different queues and a differentiation scheme, such as Weighted Fair Queuing (WFQ) applied between these queues. This provides a degree of service differentiation between different service types of non-GBR traffic at an aggregate level, but not at a per-Bearer level.

For the High-Speed Downlink Packet Access (HSDPA) protocol there are two approaches to handling TN congestion. One is a rate-based solution where service differentiation can be applied. The problem with this solution is that it is not compatible with TCP congestion control. Therefore separate queues need to be implemented in the TN for HSDPA and LTE traffic. The other approach is an Active Queue Management (AQM) based congestion control (ABCC) for HSDPA. In this solution the application level TCP is notified about TN congestion and can then be used to resolve the TN congestion. This solution has the advantage in that it is essentially compatible with LTE, and can be used together with a Relative Bitrate (RBR) manager. However, there are architectural limitations, particularly as it requires communication between the nodes that are sharing the same TN bottleneck.

Considering congestion control and resource sharing from a more general point of view, there are three approaches that might be considered, in addition to the profiling based approach proposed herein. These include window-based solutions, rate-based solutions and hierarchical scheduling solutions. Briefly these are as follows.

In a window-based solution, control of resource sharing between bearers to provide a fair share for each bearer is a very difficult problem to implement. For example the LTE may use the TCP so that the bandwidth share of a Bearer is determined based on, e.g. the number of parallel TCP flows and the TCP RTT (round-trip delay time).

Rate-based solutions require use of a sophisticated (i.e. complex) algorithm to provide good performance (e.g. high utilization). In addition to this they require a shaping (i.e. buffering) capability to enforce the calculated bitrate and also signaling between the bitrate enforcement point and the congestion detection point. The HSDPA flow-control described above is an example of a rate-based solution.

In a Hierarchical scheduling solution, for example, a hierarchical scheduler is used in the edge node to emulate the TN bottleneck. For example, with a single TN bottleneck with 10 Mbps, then a 10 Mbps shaper is used in the edge node to avoid TN congestion. This solution supports only a single edge network and requires knowledge of the capacity of all potential TN bottleneck links and the TN topology.

Currently there is no common solution that provides efficient Bearer level service differentiation. The existing approaches all suffer from limitations as described above. Even if equal sharing between bearers, rather than service differentiation, was desired some mechanism would be needed to avoid very unfair situations arising. This unfairness is illustrated below. Currently, in a RAN TN-limited case, where resource sharing between users (bearers) is based on a per-TCP flow (as currently applied in LTE) very unfair bandwidth sharing between users can result. This unfairness can be demonstrated with reference to the illustration of FIG. 3.

The left-hand part of FIG. 3 illustrates how bandwidth is shared between two bearers in a RAN TN. One bearer is handling the traffic of a single aggressive user with several (in this example 4) parallel TCP flows, while another bearer is handling the traffic of a normal user with a single TCP flow. In this case, the aggressive user effectively throttles the TN by taking up the majority of the available bandwidth. In this Radio limited case a Uu scheduler guarantees the required fairness among bearers as each user is essentially assigned the proper bandwidth, meaning that the aggressive user's access rate is effectively limited. Just for comparison, the right-hand part of FIG. 3, illustrates what occurs in an Asymmetric Digital Subscriber Line (ADSL).

Note that for the case of internet access, with a large user aggregation the capacity of the aggregation is much greater than the peak rate of a user, and so this does not present a serious problem because many aggressive users would be needed. However, this situation may change with increasing access rates, giving rise to similar unfairness problems.

As FIG. 3 shows, without a service differentiation method the bandwidth share depends on the nature of the services being used (e.g. typically a p2p service uses many parallel TCP flows), which is in direct contrast to what the operator wants (i.e. to provide premium services with a higher bandwidth share than low priority services).

The present invention has been conceived with the foregoing in mind.

SUMMARY

According to a first aspect, there is provided a method of transporting data packets over a telecommunications transport network. The data packets are carried by a plurality of bearers, each carrying data packets that relate to different ones of a plurality of services. In the method bandwidth profiling is applied to the data packets of each bearer, independently of the other bearers, to identify and mark the data packets of each of the bearers that are conformant with a predetermined maximum information rate for the bearer. The data packets are forwarded for transport through the transport network, wherein, if there is insufficient bandwidth available in the transport network to transport all data packets, data packets not identified by the profiling as being conformant are discarded, so as not to be transported through the transport network.

According to a second aspect, there is provided a network entity of a telecommunications network that provides data packets for transport through a transport network. The data packets are carried by a plurality of bearers, the bearers each carrying data packets that relate to different ones of a plurality of services. The network entity is configured to apply bandwidth profiling to the data packets of each of the bearers, independently of the other bearers, to identify data packets that are conformant with a predetermined maximum information rate for the bearer. The network entity forwards the data packets to the transport network, including an indication in each of the data packets as to whether it is a conformant data packet or is not conformant.

Embodiments overcome the aforementioned problems of bandwidth resource sharing, such as preventing an aggressive user from It is an advantage that the sharing of bandwidth between Bearers is more RAN-controlled. Also because the bandwidth profilers are implemented per-Bearer, without the need for any interaction between the different Bearer, there is flexibility as to where (i.e. in which network entity) the bandwidth profilers are implemented.

Another advantage is that the operator can set the rates for the different bearers. This means that operators can prioritise certain non-GBR traffic, and downgrade other traffic as being of lower priority.

BRIEF DESCRIPTION OF THE DRAWINGS

FIG. 3 is a schematic illustration comparing bandwidth sharing between bearers in a TN and an ADSL.

FIG. 5 shows two graphs comparing bandwidth usage over time for two bearers in a TN both with and without bandwidth profiling of each bearer.

DETAILED DESCRIPTION OF PREFERRED EMBODIMENTS

The embodiments described herein apply per-Bearer bandwidth profiling to control resource sharing among Bearers carrying different services. The embodiments employ a 'color' profiling scheme of the type described by The Metro Ethernet Forum in http://metroethernetforum.org/PDF Documents/Bandwidth-Profiles-for-Ethernet-Services.pdf.

In this scheme, packets, or frames, are assigned a color (green, yellow, or red) according to whether they are conformant with the bandwidths as specified in a Service Level Agreement (SLA). Essentially: packets assigned 'green' are conformant and are delivered in accordance with the SLA specification; packets assigned 'yellow' are out-of profile, but may be delivered if there is bandwidth available, for example because they are conformant with some specified excess bandwidth requirements; and packets assigned red are out-of profile and immediately discarded. Thus, in the embodiment described below with reference to FIG. 4, the color assigned by the profiler is propagated to the TN bottleneck and it is used to determine which packets (i.e. 'yellow' packets) may be dropped at the TN bottleneck if there is insufficient bandwidth. It will be appreciated that the 'colors' are simply a convenient label that is applied to differentiate the packets in the profiler.

To implement the color profiling scheme described by the Metro Ethernet Forum a Committed Information Rate (CIR) is specified, and additionally an Excess Information Rate (EIR) may be specified. These profile rates are enforced through an algorithm referred to as a 'token bucket', which consists of a 'bucket' of bytes referred to as 'tokens'. As data packets arrive, provided the number of tokens in the 'green' bucket exceeds the byte size of the packet, it is colored 'green'. The number of 'green' tokens in the bucket is decremented by an amount that corresponds to the 'green' packet size. 'Green' tokens are replenished in the 'green' bucket at a rate determined by the specified CIR, and hereafter referred to as the 'green' rate. If there are insufficient tokens in the 'green' bucket, the packet is either colored 'yellow', or if an EIR has been specified, it is passed to a 'yellow' bucket where in the same way the packet is either colored 'yellow' if there are sufficient 'yellow' tokens in the bucket, or is otherwise colored red and discarded. The number of 'yellow' tokens is decremented in the same way, and the 'yellow' tokens in the 'yellow' bucket are replenished at a rate determined by the specified EIR.

Figure 1:
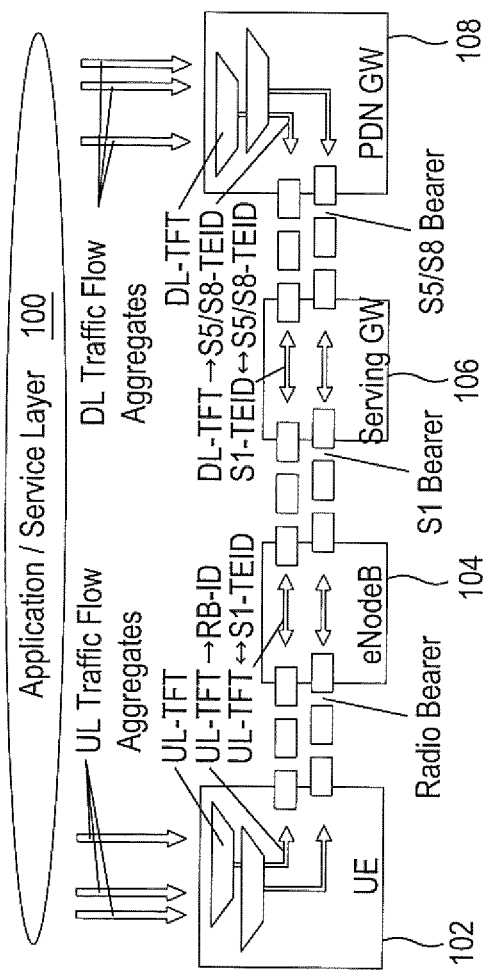
FIG. 1 is a schematic illustration showing how service differentiation is applied in existing TNs involving an LTE architecture.
Figure 2:
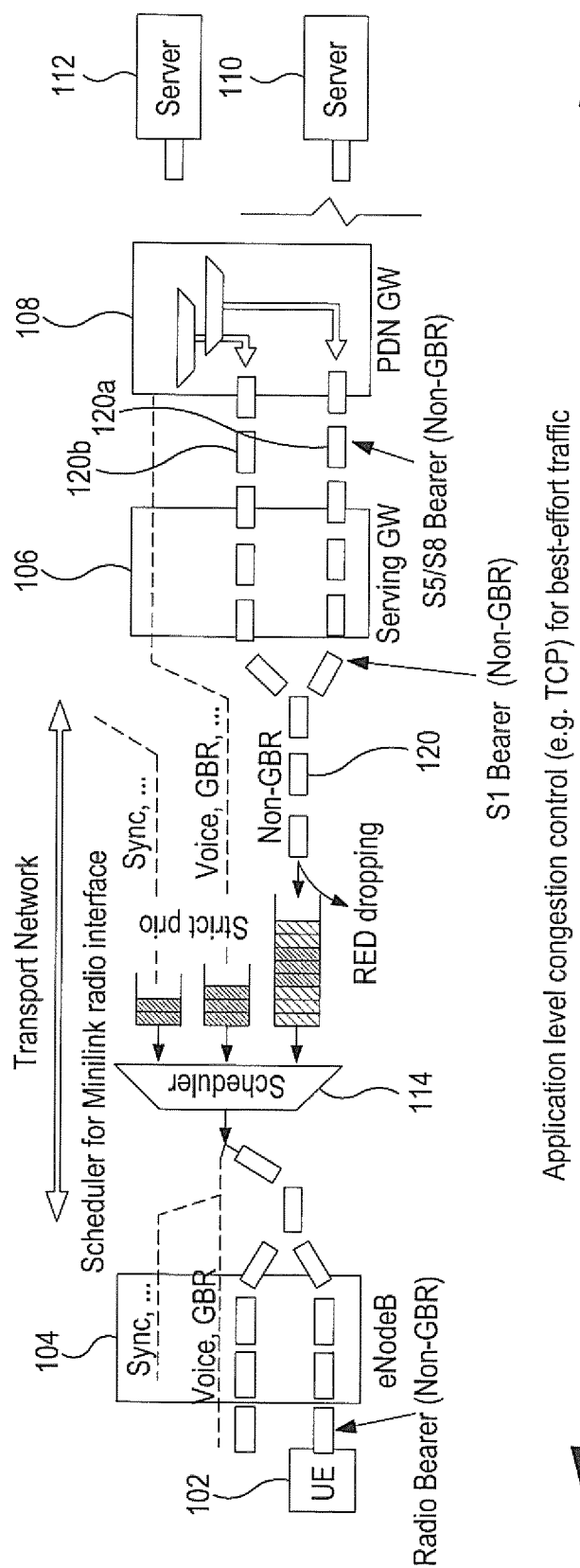
FIG. 2 is a schematic illustration showing more detail of the TN of FIG. 1.
Figure 4:
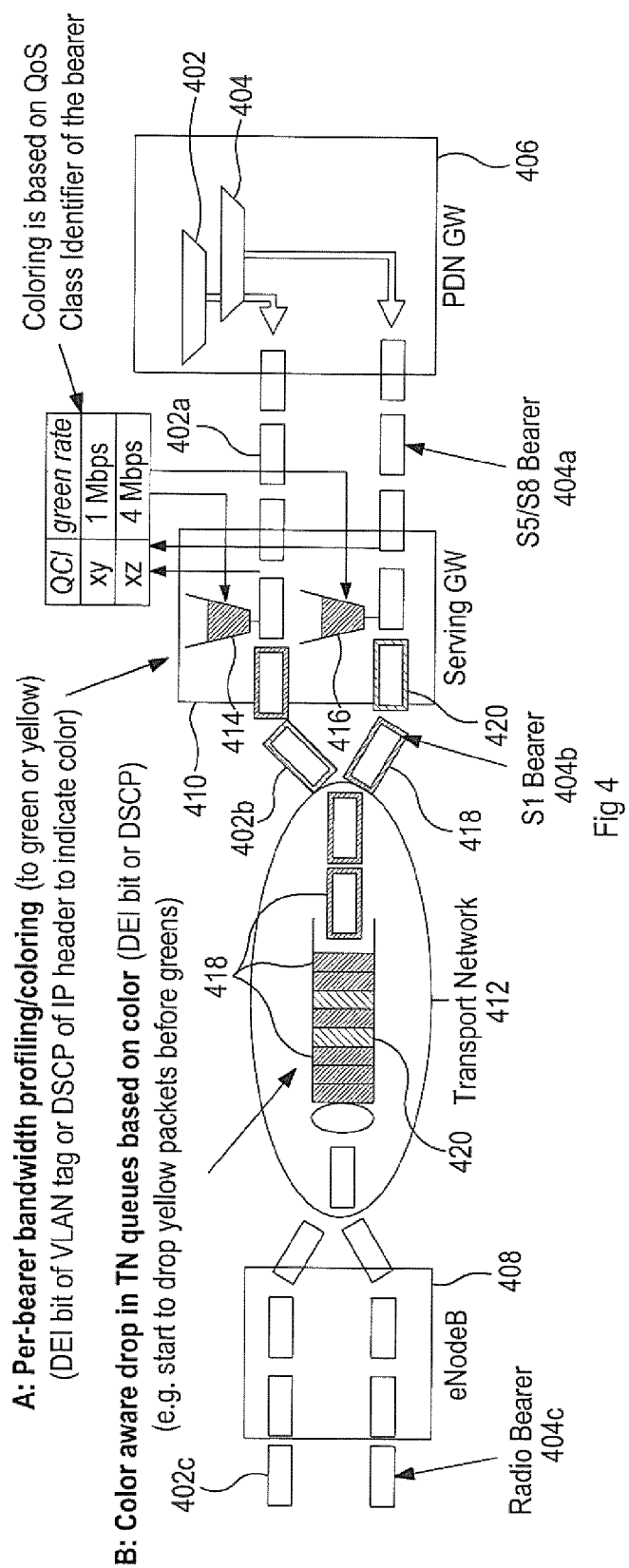
FIG. 4 is a schematic illustration of a TN employing bandwidth profiling for each bearer.

Referring to FIG. 4, where the example is shown of an LTE system with two bearers 402, 404 each carrying data packets between a PDN-GW 406 and an eNodeB 408 via a S-GW 410 and through a TN 412. The Bearers 402, 404 are designated S5/S8 bearers 402a, 404a between the PDN-GW 406 and the S-GW 410, S1 bearers 402b, 404b from the S-GW 410 over the TN 412, and radio bearers 402c, 404c beyond the eNodeB 408. Each Bearer is assigned a bandwidth profiler—profiler 414 for bearer 402 and profiler 416 for bearer 404. Each of the bearers has an assigned QoS Class Identifier (which will be explained in more detail below) and an associated predefined 'green' rate (CIR) and bucket size. In this example there is no EIR specified, and so there is no 'yellow' rate or 'yellow' bucket.

In this example, the profilers 414, 416 are located in the S-GW 410, but this is not a requirement. The profiling can be implemented in any node where per-Bearer handling and coloring is possible. For LTE, coloring can be done in the S-GW or in the PDN-GW or in the site switch. Although not shown in FIG. 4, the site switch contains transport devices (e.g. Ethernet switch and routers belonging to the mobile operator) and connects the S-GW or PDN-GW to the TN. For HSDPA, coloring could be done in the RNC or in the GGSN, for example.

Packets of each Bearer 402, 404 that conform with the bearer's profiler 414, 416 are marked as conformant packets 418 (i.e. assigned 'green') and packets that do not conform are marked as non-conformant packets 420 (i.e. assigned 'yellow'). Because there are no 'yellow' buckets all data packets that are not colored 'green' by the profilers 414, 416 are assigned 'yellow' (and thus there are no 'red' packets). For example, assume that the 'green rate' is 5 Mbps for a Bearer and the bitrate of this Bearer is about 7.5 Mbps. In this case, approximately ⅓ of the packets of the Bearer will be assigned to 'yellow'.

The TN 412 bottleneck active queue management can then use the color information marked in the data packets when choosing which packets to drop when there is insufficient bandwidth (congestion). The first packets to be dropped will be the 'yellow' packets 420. In other words a 'color aware' dropping of data packets is used in TN bottleneck queue.

In the example described, a two-color (green-yellow) profiler is used for each Bearer. The bucket size and 'green' rate at which rate the green tokens arrive into the buckets for each of the Bearers are set by the operator. When the profiler 414, 416 assigns a Packet either 'green' or 'yellow', this means that the packet is marked with the conformance information in such a way it can be used at the TN bottleneck buffer(s). For example the Drop Eligibility (DEI) bit of the packet's Ethernet frame, or the Differentiated Services Control Point (DSCP) field in the IP header could be used to indicate if a packet has been assigned 'green' or 'yellow'. Other mechanisms might also be used. In some cases additional mapping might be needed, for example to fill in the DEI bit based on the DSCP value. The only requirement is that the color information that is assigned to the packets of a Bearer by the profiler must be kept by the packets up until the TN bottleneck so as to be available for the color aware dropping of packets.

For example, in an LTE system such as that shown in FIG. 4, the per-Bearer level coloring could be done in the PDN-GW 406 (rather than in the S-GW 410 as shown).

From the PDN-GW 406 the packets go to the S-GW 410 and from the S-GW 410 to the TN 412. The TN 412 may comprise a Mobile Back-Haul (MBH—not shown) where the color information is used. If the PDN-GW 406 and the S-GW 410 are connected by an Ethernet connection, then the PDN-GW 406 can use the DEI bit of the Ethernet frame (packet) to signify the color assigned to the packet. The S-GW 410 reads out the DEI bit of incoming packets and when these packets leave the S-GW 410 towards MBH the DEI bit of the outgoing packets are set accordingly. Alternatively, if the DSCP field of the IP packet is used to signify the color assigned to the packet at the PDN-GW 406, then the S-GW 410 reads out the value in the DSCP field and uses it to fill in the DEI bit of the outgoing Ethernet frames sent to the MBH.

Although described above in relation to LTE architecture, the method can be applied equally well in a HSDPA or a common TN (common between LTE and HSDPA). It can also be applied to TNs operating with multiple RBSs (e.g. NodeBs and eNodeBs) sharing the same TN bottleneck. For this common transport there is no requirement for any direct communication between nodes. Each node may be provided with a separate 'green' rate table (see below) or the green rates may be harmonized across the different technologies and nodes. For example a Bearer serving a given service may always get (e.g.) a 1 Mbps 'green' rate independently whether it uses LTE or HSDPA. Also, in a more sophisticated embodiment, the profilers may include a 'yellow' bucket, with a specified 'yellow' rate (equivalent to the EIR described above) at which 'yellow' tokens arrive. In that case packets that non-conformant with both the 'green' and 'yellow' rates, are assigned red packets and will be discarded (i.e. not transported over the TN).

Operators may take account of a variety of available information in order to set the 'green' rate (and, if used, the 'yellow' rate) for a particular bearer. This may be based, at least in part, on the available service information of the Bearer (roughly speaking the QoS requirement of the Bearer, which in the case of LTE is coded in the QCI value). Thus, a predefined green rate may be assigned for a given QCI value. This may be implemented by means of a table that maps the requirement of the Bearer (e.g. based on the QCI value assigned to the Bearer) into a 'green' rate value (as shown in FIG. 4). This table may be essentially static (i.e. not frequently updated) and may also include default values (e.g. where the QCI value assigned to the bearer does not correspond to a QCI value in the table).

When configuring the table, the operator may take into account of various information, for example: (i) information about the service(s) and subscriptions; (ii) information about the TN; and (iii) information about traffic. These are discussed in more detail below. Note that how much detail is provided in the table—e.g. how many different QCIs are used and the 'green' rates assigned to them—is basically the operator's decision and may depend on various factors such as business models, knowledge about subscribers, the network, etc.

1) A priori information about service and subscription. This information is used to define the Bearer category. Subscription information may be used, for example, to define a different QCI for a premium service/user than for a normal service/user. Another example might be to define different QCIs for Laptop users and Smartphone users. The subscription information might include a guaranteed throughput value, which can then be used to determine a 'green' rate. As long as the sum of the 'green' rates over a TN bottleneck is smaller than the TN bottleneck speed, this setting will guarantee the given 'green' rate.

One or more properties of the service may also be used. For example, a different QCI may be defined for a delay sensitive service. Also, a particular QCI may be defined for a p2p service.

2) A priori information about the TN. The operator may take account of capacity information. If the capacity of the bottleneck is known then this information can be used in the determination of green rates. For example, for a 10 Mbps TN the 'green' rate would only be up to 10 Mbps, but for a higher capacity TN higher green rates can be used. Also, if the operator knows the TN topology then this information can be taken into account. For example, when many NodeBs and eNodeBs share the TN bottleneck, then the operator can chose to apply smaller 'green' rates.

3) A priori information about traffic. The operator may use information about the typical traffic mix, and where the fairness of the shared resource needs improvement. For example, where the operator has information that shows there to be unfair access caused by a few, more aggressive, parallel Bearers, then the 'green' rates can be set to restrict the rates of the aggressive bearers to improve the fairness.

Also, the operator may decide to use a different table (or provide different 'green' rate values in the table) at different times of the day and/or week. For example different 'green' rates may be applied at busy periods compared with other times.

FIG. 5 illustrates the results of some simulations that show the benefits of the per-Bearer profiling described above. In FIG. 5, the top graph illustrates the share of bandwidth in a TN between an aggressive user using 10 TCP flows, and a normal user using 1 TCP flow, and without any per-Bearer bandwidth profiling. The capacity of the TN is 10 Mbps, and as can be seen, the majority of this is taken up by the aggressive user, leaving little bandwidth available for the normal user. The lower graph in FIG. 5 illustrates the share of bandwidth for the same two users, but where bandwidth profiling with a 'green' rate of 5 Mbps has been applied to both users. In this case there may be assumed to be a 'target' bandwidth share of 50% of the available bandwidth for each user. Although this is not quite realized, it can be seen that the bandwidth taken up by the aggressive user (below the line on the graph) and by the normal user (above the line) is a much fairer split.

As FIG. 5 shows, the application of the per-bearer bandwidth profiling results in a much fairer share of TN resources. Moreover, this bandwidth sharing between Bearers is under the control of the RAN. The concept is, by its nature, also applicable to a common RAN scenario, in addition to the LTE or HSDPA scenarios described. The bandwidth profilers can be implemented per-Bearer without any interaction between different Bearers or the profilers, and therefore it is flexible where (i.e. in which node) the bandwidth profilers are placed.

A major advantage is the ability that the operator has in setting the 'green' rates for the different bearers. This means that operators can prioritise certain non-GBR traffic, and downgrade other traffic as being of lower priority.

An additional advantage is the possibility to provide bandwidth guarantees to certain users where special conditions arise. Also, if for some reason a mis-configuration of the profilers arises, the system can be configured to revert to current methods of resource sharing (e.g. relying on the TCP).

The invention claimed is:

1. A method of transporting data packets over a telecommunications transport network between a Serving gateway (S-GW) or Packet Data Network gateway (PDN-GW) and a radio base station, wherein the data packets are carried by a plurality of non-guaranteed-bit-rate (non-GBR) bearers, the bearers each carrying data packets that relate to different ones of a plurality of services, the method comprising:
   defining a committed information rate (CIR) for each bearer based on quality-of-service (QoS) requirements of a service to which received data packets relate, as well as on a capacity of a transport network and network topology of a radio base station (RBS) and a gateway (GW) to and from which the data packets are transported via the transportation network established between the RBS and GW, wherein the gateway is a serving gateway (S-GW) or a packet data network gateway (PDN-GW), wherein the transport network is part of a communication network;
   at a network node configured to handle the data packets on a per-bearer basis, applying bandwidth profiling to the data packets of each bearer, independently of the other bearers, to identify and mark the data packets of each of the bearers that are conformant with the defined committed information rate (CIR) for the bearer, wherein the network node is disposed outside the transport network, wherein the defined committed information rate (CIR) is specific to the capacity of the transportation network and the quality-of-service (QoS) requirements of the service to which the received data packets relate; and
   forwarding the data packets from the network node to the transport network if there is sufficient bandwidth available in the transport network to satisfy the respective committed information rate (CIR) of the data packets, where, if there is insufficient bandwidth available in the transport network to transport all data packets in satisfaction of the committed information rate (CIR), data packets identified by the profiling as not being conformant are the first to be discarded, so as not to be transported through the transport network.

2. The method of claim 1, wherein the bandwidth profiling includes assigning the conformant data packets of a bearer as 'green' data packets, and assigning other data packets that are not conformant as 'yellow'.

3. The method of claim 2 wherein applying bandwidth profiling to the data packets comprises, for each bearer:
   receiving the data packets at a data packet bucket of the bearer;
   providing 'green tokens' to arrive in the bucket at a 'green rate' corresponding to the committed information rate of the bearer, whereby at any moment in time the bucket contains a quantity of 'green tokens';

designating a packet as a 'green' packet when the size of the packet is less than or equal to the quantity of 'green tokens' in the bucket and decrementing the quantity of 'green' tokens in the bucket by an amount equivalent to the size of the packet; and designating a packet as a 'yellow' packet when the size of the packet is greater than or equal to the quantity of 'green tokens' in the bucket.

4. The method of claim 3, wherein a packet is designated as a 'yellow' packet only if it has a size less than or equal to a predetermined maximum size, wherein a packet is designated as a 'red' packet if it has a size greater than the predetermined maximum size, and wherein transporting the data packets comprises discarding all 'red' packets so that they are not transported through the transport network.

5. The method of claim 2, wherein applying the bandwidth profiling further comprises adding an indication of the packet 'color' to a data field in the packet.

6. The method of claim 5 wherein the indication of the packet 'color' comprises a Drop Eligibility (DEI) bit and/or a Differentiated Services Control Point (DSCP) field in an IP header of the packet.

7. The method of claim 1 wherein defining the committed information rate (CIR) of each respective bearer is further based on historical information relating to the transport of data packets through the transport network.

8. The method of claim 1, wherein the committed information rate (CIR) of each respective bearer is determined from a table of values of predefined rates for different QoS requirements.

9. The method of claim 8, wherein the transport network transports the data packets from a LTE network, and wherein the QoS requirements of a service are expressed as a QCI value.

10. The method of claim 9, further comprising initially defining the QCI value of a service based on subscription information of the user of the service and/or other properties of the service.

11. The method of claim 8, comprising using different tables of rate values at different times to account for varying traffic usage of the transport network.

12. A network entity of a telecommunications network that provides data packets for transport through a transport network to a radio base station, wherein the data packets are carried by a plurality of bearers, the bearers each carrying data packets that relate to different ones of a plurality of services, the network entity being configured to:
handle the data packets on a per bearer basis and to determine a committed information rate for each bearer based on quality-of service (QoS) requirements of services to which the received data packets relate, as well as on a capacity of the transport network and network topology of a radio base station (RBS) and a gateway (GW) to and from which the data packets are transported via the transportation network established between the RBS and GW, wherein the gateway is a serving gateway (S-GW) or a packet data network gateway (PDN-GW), wherein the transport network is part of a communication network;
at a network node of the communication network apply bandwidth profiling to the data packets of one or more of the bearers, independently of the other bearers, wherein the network node is disposed outside the transport network;
identify data packets that are conformant with the committed information rate for the bearer;
if there is sufficient bandwidth available in the transport network to satisfy the respective committed information rate (CIR) of the data packets forward the data packets from the network node to the transport network including an indication in each of the data packets that indicates that the respective data packets are conformant; and
if there is insufficient bandwidth available in the transport network to transport all data packets in satisfaction of the committed information rate (CIR), ensuring data packets identified by the profiling as not being conformant are the first to be discarded, so as not to be transported through the transport network.

13. The network entity of claim 12, wherein the network entity is configured to apply a 'color' bandwidth profiling to the data packets of each of the bearers to assign as 'green' data packets that are conformant with the committed information rate for the bearer, and assigning as 'yellow' data packets that are not conformant.

14. The network entity of claim 13 further configured to assign a data packet as 'yellow' only if it is conformant with a predetermined excess information rate defined by a 'yellow' rate, and to assign a data packet as 'red' if it is not conformant with the excess information rate.

15. The network entity of claim 13, further comprising:
a data packet bucket for each bearer for receiving the data packets of the bearer, wherein the network entity is configured to:
provide 'green tokens' to the data packet bucket at a 'green rate' corresponding to the committed information rate of the bearer, so that at any moment in time the bucket contains a quantity of 'green tokens', and wherein the network entity is further configured to:
designate a packet as a 'green' packet when the size of the packet is less than or equal to the quantity of 'green tokens' in the bucket; and
designate a packet as a 'yellow' packet when the size of the packet is greater than or equal to the quantity of 'green tokens' in the bucket.

16. The network entity of claim 12 wherein the network entity is configured to determine the committed information rate from a table of values of predefined rates for different QoS requirements.

17. The network entity of claim 12, wherein the network entity is a Serving Gateway (SGW) or a Packet Data Network Gateway (PDN-GW) in a LTE network.

18. The network entity of claim 12, wherein the network entity is a Radio Network Controller (RNC) or a Gateway GPRS Support Node (GGSN) in a High-Speed Downlink Packet Access (HSDPA) network.

* * * * *